(12) United States Patent
Seanor

(10) Patent No.: US 11,792,043 B2
(45) Date of Patent: Oct. 17, 2023

(54) SYSTEMS AND METHODS FOR GOVERNING VPN ACCESS USING A REMOTE DEVICE IN PROXIMITY TO A VPN ENDPOINT

(71) Applicant: Fortinet, Inc., Sunnyvale, CA (US)

(72) Inventor: Jonathan Karl Seanor, Nottingham (GB)

(73) Assignee: Fortinet, Inc., Sunnyvale, CA (US)

(*) Notice: Subject to any disclaimer, the term of this patent is extended or adjusted under 35 U.S.C. 154(b) by 8 days.

(21) Appl. No.: 17/393,307

(22) Filed: Aug. 3, 2021

(65) Prior Publication Data

US 2023/0041438 A1 Feb. 9, 2023

(51) Int. Cl.
*H04L 12/46* (2006.01)
*H04L 67/143* (2022.01)

(52) U.S. Cl.
CPC ........ *H04L 12/4641* (2013.01); *H04L 67/143* (2013.01)

(58) Field of Classification Search
CPC .......................... H04L 12/4641; H04L 67/143
See application file for complete search history.

(56) References Cited

U.S. PATENT DOCUMENTS

| | | | |
|---|---|---|---|
| 10,855,664 B1* | 12/2020 | Ziraknejad | .............. H04W 4/02 |
| 2012/0093141 A1* | 4/2012 | Imes | ..................... F24F 11/523 |
| | | | 370/338 |
| 2016/0112871 A1* | 4/2016 | White | ................... H04W 12/06 |
| | | | 726/4 |
| 2020/0233949 A1* | 7/2020 | Xia | ........................ H04W 12/08 |
| 2020/0344213 A1* | 10/2020 | Gorsica, IV | .......... G06F 21/606 |

* cited by examiner

*Primary Examiner* — Glenton B Burgess
*Assistant Examiner* — Patrick F Ngankam

(57) ABSTRACT

Various embodiments provide for governing VPN access using a device remote from a VPN endpoint.

20 Claims, 7 Drawing Sheets

SYSTEMS AND METHODS FOR GOVERNING VPN ACCESS USING A REMOTE DEVICE IN PROXIMITY TO A VPN ENDPOINT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

BACKGROUND

Field

Embodiments of the present disclosure generally relate to virtual private network (VPN) access, and more particularly to systems and methods for governing VPN access using a device remote from a VPN endpoint.

Description of the Related Art

Setting up a web application firewall (WAF) can include using an application programming interface (API) that identifies the type of network traffic that should be expected when operating a particular application in a network environment. In operation, the WAF compares network traffic with the API to determine if the traffic is expected. Where the traffic is expected, it is allowed. Otherwise, the network traffic is identified as potentially malicious and may be denied. A problem happens when the API is either not provided by the owner of the application or is not correct. In such cases, the WAF may find itself denying necessary traffic or allowing malicious traffic.

Hence, there exists a need in the art for advanced systems and methods for identifying traffic corresponding to an API.

SUMMARY

Various embodiments of the present disclosure generally relate to VPN access, and more particularly to systems and methods for governing VPN access using a device remote from a VPN endpoint.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1A:
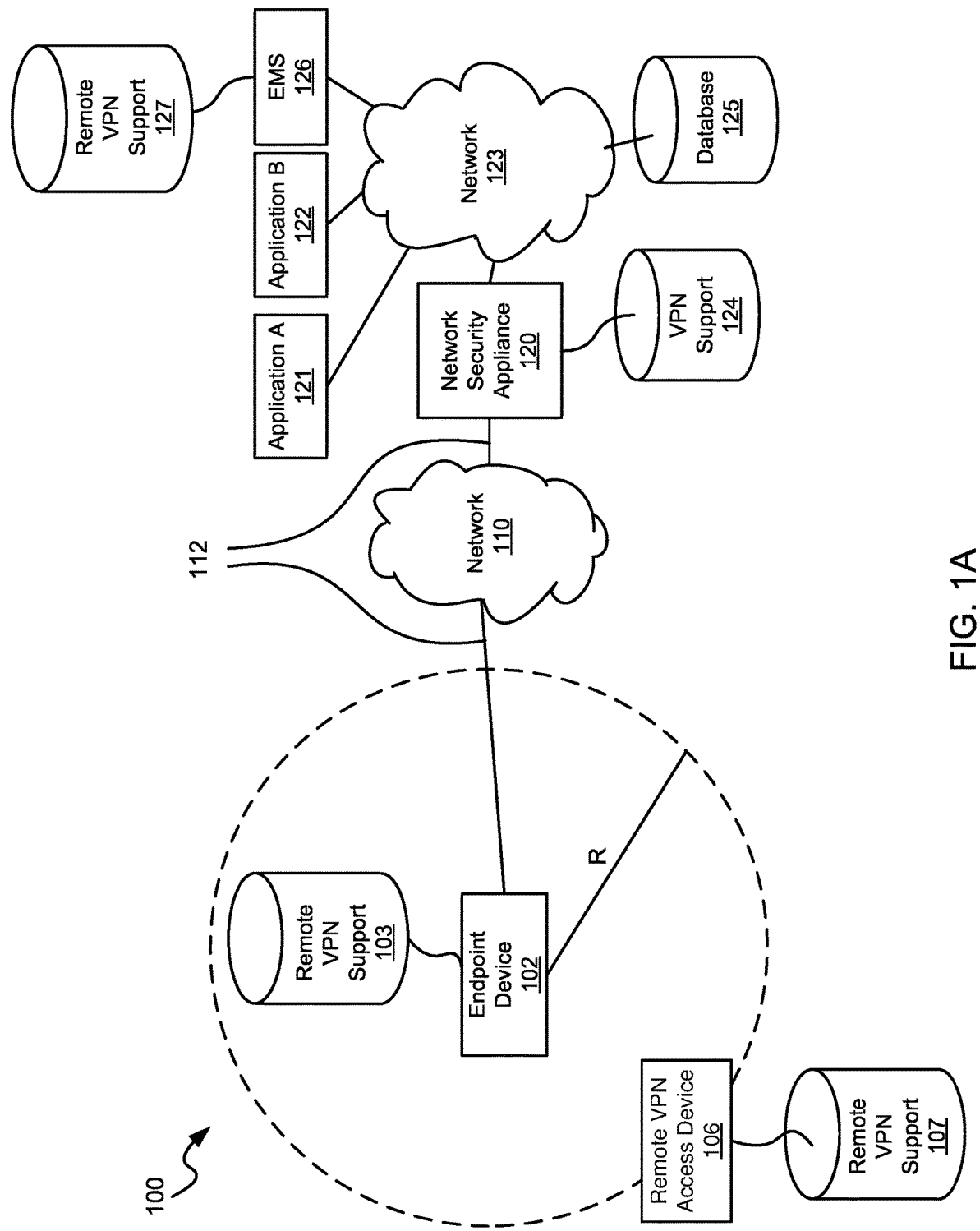
FIGS. 1A-1D illustrates an example network environment including proximity based VPN control devices and applications in accordance with various embodiments.

Various embodiments of the present disclosure generally relate to VPN access, and more particularly to systems and methods for governing VPN access using a device remote from a VPN endpoint.

In an example VPN scenario, a user accesses an endpoint device and manually initiates a VPN with a receiving network device. Such manual initiation may include either the user of the endpoint device clicking on a VPN connection on a graphical user interface (GUI) or it may be triggered when the user of the endpoint device engages an activity on the endpoint device such as a user logon where the endpoint device is configured to initiate such a VPN connection upon occurrence of an action local to the endpoint. Once the VPN is established between the endpoint device and the receiving network device, communications between the endpoint device and network elements serviced by the network device can be done over the VPN using private key/public key encryption facilitated by the VPN connection.

Similarly, when a user of the endpoint device wants to terminate the VPN connection, they also perform a manual action local to the endpoint device that causes the endpoint device to terminate the connection. Such manual may include manually interacting with the GUI that controls the VPN by, for example, clicking a "Disconnect" button, the user logging off of the endpoint device.

Such connection and disconnection of a VPN tunnel requires either the physical presence of the user at the endpoint device, or that the user be remotely logged into the endpoint device at the initiation and/or end of the VPN connection life-cycle. Some embodiments provide systems and methods that allow for initiation and/or termination of VPN connectivity between the endpoint device and the network device without requiring physical presence at the endpoint device or the user being remotely logged into the endpoint device. As such, a user does not need to be physically present at the endpoint device to effectuate a VPN connection. This is different than using, for example, a software application running on the endpoint device to initiate a VPN connection at a defined time as the initiation and termination of the VPN connection remains under control of the user.

When a VPN tunnel is connected between the endpoint device and the network device, the endpoint device may be authenticated by one or more of the following: i) name; ii) password, one-time-password, or passcode; and/or iii) a personal identification certificate. Such user authentication generally occurs once, at the beginning of a connection, and may not occur again for the duration of the VPN connection life-cycle. Further, in some cases, endpoint device authentication may be performed based upon one or more of the following: i) the presence of a physical device (e.g., a hardware dongle) connected to the endpoint device, or some data (e.g., a particular file or certificate) in the memory of the endpoint device. Such endpoint device authentication results in a binary decision (e.g., element present or element absent).

Some embodiments provide for initiating a VPN connection between an endpoint device and a network device using another device remote from the endpoint device, and for terminating that VPN connection based at least in part on a relative distance of the device that initiated the VPN connection and the endpoint device. Such embodiments, among other things, avoid the insecurity that happens when a VPN connection is negligently left active. In some cases, embodiments herein use more than discrete states of presence and absence to control initiation, termination, and/or the ongoing operation of a VPN connection. Rather, some embodiments use a combination of presence at an identified distance to make a determination as to permitting initiation, termination, and/or the ongoing operation of a VPN connection.

Various embodiments provide methods for remote governance of a VPN connection. Such methods include: receiving a distance between a remote VPN access device and an endpoint device; and modifying a VPN connection of the endpoint device based at least in part upon the distance between a remote VPN access device and the endpoint device. In some instances of the aforementioned embodiments, modifying the VPN connection of the endpoint device includes automatically terminating the VPN connection where the distance between the remote VPN access device and the endpoint device is greater than a threshold. In some cases, receiving the distance between the remote VPN access device and the endpoint device includes determining the distance between the remote VPN access device and the endpoint device.

In various instances of the aforementioned embodiments, the methods further include receiving a message initiated by the remote VPN access device requesting termination of the VPN connection. The message initiated by the remote VPN access device is based at least in part on the distance between the remote VPN access device and an endpoint device. In such instances, modifying the VPN connection of the endpoint device is based at least in part on the message and includes terminating the VPN connection. In some cases, the message initiated by the remote VPN access device is received by the processing resource via an endpoint management system (EMS) with which both the remote VPN access device and the endpoint device are registered.

In one or more instances of the aforementioned embodiments, the methods further include: receiving a message initiated by the remote VPN access device requesting initiation of the VPN connection. The message initiated by the remote VPN access device is based at least in part on the distance between the remote VPN access device and an endpoint device. In such instances, modifying the VPN connection of the endpoint device is based at least in part on the message and includes initiating the VPN connection. In some cases, the message initiated by the remote VPN access device is received by the processing resource via an element management EMS with which both the remote VPN access device and the endpoint device are registered. In some cases the message initiated by the remote VPN access device is received by the processing directly from the remote VPN access device.

In various instances of the aforementioned embodiments, the distance between the remote VPN access device and the endpoint device is determined by determining that the remote VPN access device is communicably coupled to the endpoint device via a type of network, and wherein the distance is selected based upon the type of network. In some instances of the aforementioned embodiments, the method further includes: registering the endpoint device with the same EMS with which the remote VPN access device is registered; and pairing the endpoint device with the remote VPN access device.

Other embodiments provide methods for remote governance of a VPN connection. Such methods include: determining a distance between a remote VPN access device and an endpoint device; comparing the distance between the remote VPN access device and the endpoint device with a threshold; and sending a message requesting modification of a VPN connection of the endpoint device. Sending the message is based at least in part upon comparing the distance between the remote VPN access device and the endpoint device.

In some instances of the aforementioned embodiments, sending the message requesting modification of the VPN connection of the endpoint device includes: sending the message to the endpoint device directly based at least in part upon the distance being less than the threshold; and sending the message to the endpoint device via an EMS based at least in part on the distance being greater than the threshold. Both the endpoint device and the remote VPN access device are registered with the EMS. In various instances of the aforementioned embodiments, the methods further include: registering the remote VPN access device with the same EMS with which the endpoint device is registered; and pairing the endpoint device with the remote VPN access device.

Yet other embodiments provide systems for remote governance of a VPN connection. Such systems include: a remote VPN access device, and an endpoint device. The remote VPN access device includes a first processing resource and a first non-transient computer readable medium. The first non-transient computer readable medium includes instructions that when executed by the first processing resource causes the remote VPN access device to: determine a distance between the remote VPN access device and an endpoint device; compare the distance between the remote VPN access device and the endpoint device with a threshold; and send a message requesting modification of a VPN connection of the endpoint device. Sending the message is based at least in part upon comparing the distance between the remote VPN access device and the endpoint device. The endpoint device includes a second processing resource and a second non-transient computer readable medium. The second non-transient computer readable medium includes instructions that when executed by the second processing resource causes the endpoint device to: receive the message requesting modification of the VPN connection of the endpoint device; and modify the VPN connection of the endpoint device based at least in part upon the message requesting modification of the VPN connection of the endpoint device.

In some instances of the aforementioned embodiments, sending the message requesting modification of the VPN connection of the endpoint device includes: sending the message to the endpoint device directly based at least in part upon the distance being less than the threshold; and sending the message to the endpoint device via an EMS based at least in part on the distance being greater than the threshold. Both the endpoint device and the remote VPN access device are registered with the EMS.

In various instances of the aforementioned embodiments, the first non-transient computer readable medium further includes instructions that when executed by the first processing resource causes the remote VPN access device to: register the remote VPN access device with the same EMS with which the endpoint device is registered; and pair the endpoint device with the remote VPN access device. In some instances of the aforementioned embodiments, the second non-transient computer readable medium further includes instructions that when executed by the second processing resource causes the endpoint device to: register the endpoint device with the same EMS with which the remote VPN access device is registered; and pair the endpoint device with the remote VPN access device.

Further embodiments provide non-transient computer readable media including instructions that when executed by a processing resource cause the processing resource to perform the method of: receiving a distance between a remote VPN access device and an endpoint device; and modifying a VPN connection of the endpoint device based at least in part upon the distance between a remote VPN access device and the endpoint device. In some instances of the aforementioned embodiments, modifying the VPN connection of the endpoint device includes automatically terminating the VPN connection where the distance between the remote VPN access device and the endpoint device is greater than a threshold.

Yet other embodiments provide non-transient computer readable media including instructions that when executed by a processing resource cause the processing resource to perform the method of: determining a distance between a remote VPN access device and an endpoint device; comparing the distance between the remote VPN access device and the endpoint device with a threshold; and sending a message requesting modification of a VPN connection of the endpoint device. Sending the message is based at least in part upon comparing the distance between the remote VPN access device and the endpoint device. In some instances of the aforementioned embodiments, sending the message requesting modification of the VPN connection of the endpoint device includes sending the message to the endpoint device directly based at least in part upon the distance being less than the threshold; and sending the message to the endpoint device via an EMS based at least in part on the distance being greater than the threshold. Both the endpoint device and the remote VPN access device are registered with the EMS.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking, data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Turning to FIG. 1A, an example network environment 100 is shown in which an endpoint device 102 including a remote VPN support application 103 in accordance with some embodiments. Remote VPN support application 103 is executable by a processor in endpoint device 102 to govern operation of a VPN connection 112 between endpoint device 102 and another network device (e.g., a network security device 120) via a network 110. The VPN connection is initiated, terminated, and/or controlled based upon a distance R between a remote VPN access device 106. The remote VPN access device 106 executes a remote VPN support application 107 that controls the operation of the initiation of the aforementioned VPN connection 112. Endpoint device 102 includes a graphical user interface or other interface that facilitates communication with a user and/or other devices. In one particular embodiment, endpoint device 102 is a computer. Based upon the disclosure provided herein, one of ordinary skill in the art will recognize a variety of devices that may be used as endpoint device 102. Similarly, remote VPN access device 106 includes a graphical user interface or other interface that facilitates communication with a user and/or other devices. In one particular embodiment, remote VPN access device 106 is a mobile phone including a processor. Based upon the disclosure provided herein, one of ordinary skill in the art will recognize a variety of devices that may be used as remote VPN access device 106.

Network security appliance 120 protects a private network 123 including a number of applications (e.g., application A 121 and application B 122), one or more endpoint management systems (e.g., EMS 126), and one or more databases (e.g., database 125). EMS 126 includes a remote VPN support application 127 that when executed by a processor on EMS 126 controls one or more operations relevant to establishing VPN connection 112. Network security appliance 120 includes a VPN support application 124 that when executed by a processor of network security appliance 120 performs the processes of initiating, using, and terminating VPN connection 112.

Networks 110, 123 may be any type of communication network known in the art. Those skilled in the art will appreciate that, one or both of networks 110, 123 (they may be different types of networks) can be a wireless network, a wired network or a combination thereof that can be implemented as one of the various types of networks, such as an Intranet, a Local Area Network (LAN), a Wide Area Network (WAN), an Internet, and the like. Further, networks 110, 123 can be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Figure 1B:
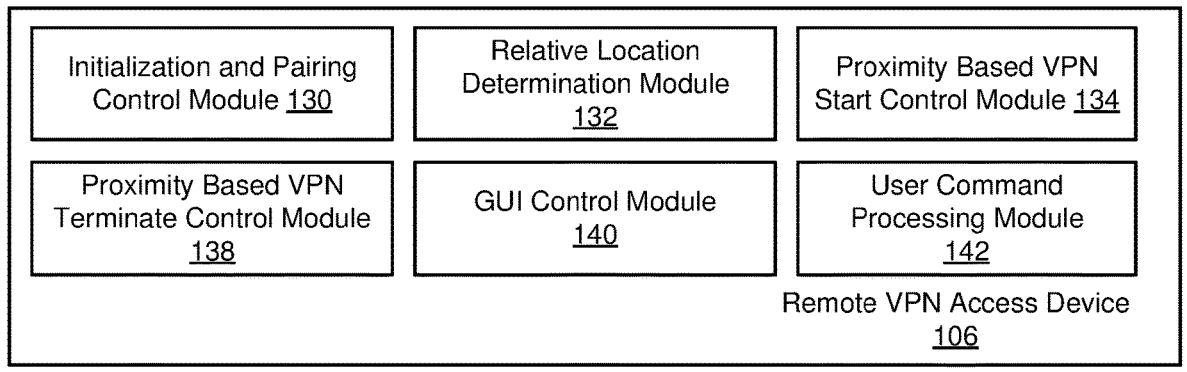

Turning to FIG. 1B, an implementation of remote VPN access device 106 is shown in accordance with some embodiments. In particular, remote VPN access device 106 is shown as having a number of modules that are each executable to perform particular functions of remote VPN access device 106 including: an initialization and pairing control module 130, a relative location determination module 132, a proximity based VPN start control module 134, a proximity based VPN terminate control module 138, a GUI control module 140, and a user command processing module 142.

Initialization and pairing control module 130 performs the processes of registering remote VPN access device 106 with EMS 126, and pairing remote VPN access device 106 with endpoint device 102. In some embodiments, initialization and pairing control module 130 performs the functions attributed to the remote VPN access device in FIG. 2 below.

Relative location determination module 132 is configured to determine a physical distance between endpoint device 102 and remote VPN access device 106. The process of updating the relative physical distance may be done using any process known in the art for determining distance. For example, in some embodiments, both the endpoint device and the remote VPN access device include location circuits (e.g., a global position satellite (GPS) location circuit) as are known in the art. In such embodiments, both devices establish their own location using the location circuit, and each transfers its location to the other. Both devices can then calculate a physical distance between the pair using the pair of locations. As another example, the existence of a short range wireless connection (e.g., a Bluetooth™ connection) may be sensed by each device. In such a condition, the expected range of the short range wireless connection may be used as the physical distance between the remote VPN access device and the endpoint device. As another example, it may be determined whether the remote VPN access device is physically connected to the endpoint device via, for example, a universal serial bus (USB) connection. Where such is the case, a physical distance between the endpoint device and the remote VPN access device may be set to zero. Based upon the disclosure provided herein, one of ordinary skill in the art will recognize a variety of approaches for determining relative physical distance between the endpoint device and the remote VPN access device that may be used in relation to different embodiments.

A proximity based VPN start control module 134 is configured to request the start of a VPN connection between endpoint device 106 and another network device. The way this request is done and whether the request can even be made is based at least in part on the proximity of remote VPN access device 106 to endpoint device 102. FIGS. 3-6 below discuss various approaches for setting up a VPN connection that may in part be performed by proximity based VPN start control module 134 depending upon the particular embodiment.

Proximity based VPN terminate control module 138 is configured to command termination of an operating VPN connection between endpoint device and any other network device based at least in part on a physical distance between endpoint device 102 and remote VPN access device 106. In some embodiments, proximity based VPN terminate control module 138 is configured to determine whether a VPN disconnect proximity requirement has not been met. Determining whether the VPN proximity requirement is not met is done by comparing the relative physical distance of the paired devices available from relative location determination module 132 with a proximity value. Where the VPN disconnect proximity requirement has not been met (i.e., the physical distance between endpoint device 102 and the remote VPN access device 106 is greater than the proximity value, remote VPN access device 106 communicates a message to EMS 126 indicating that VPN connection 112 is to be disconnected.

GUI control module 140 is configured to control a GUI of remote VPN access device 106 and performs a number of functions in relation to the GUI including, but not limited to, displaying available VPN tunnels to a user via the GUI and receiving user selections via the GUI. Based upon the disclosure provided herein, one of ordinary skill in the art will recognize a number of GUI processes that may be controlled in accordance with different embodiments. User command processing module 142 is configured to accept user commands received from, for example, the GUI of the remote VPN access device 106. Based upon the disclosure provided herein, one of ordinary skill in the art will recognize a variety of user command processing that may be done in relation to different embodiments.

Figure 1C:
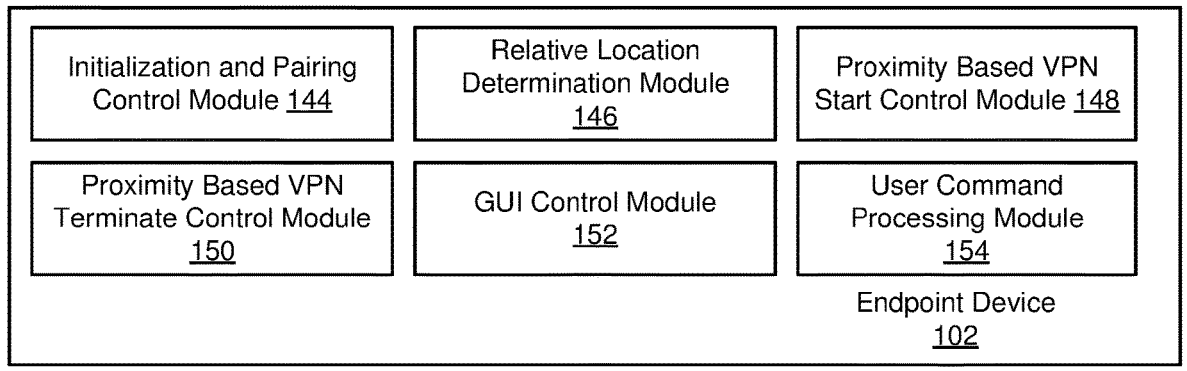

Turning to FIG. 1C an implementation of endpoint device 102 is shown in accordance with some embodiments. In particular, endpoint device 102 is shown as having a number of modules that are each executable to perform particular functions of endpoint device 102 including: an initialization and pairing control module 144, a relative location determination module 146, a proximity based VPN start control module 148, a proximity based VPN terminate control module 150, a GUI control module 152, and a user command processing module 154.

Initialization and pairing control module 144 performs the processes of registering remote endpoint device 102 with EMS 126, and pairing remote VPN access device 106 with endpoint device 102. In some embodiments, initialization and pairing control module 130 performs the functions attributed to the endpoint device in FIG. 2 below.

Relative location determination module 146 is configured to determine a physical distance between endpoint device 102 and remote VPN access device 106. The process of updating the relative physical distance may be done using any process known in the art for determining distance. For example, in some embodiments, both the endpoint device and the remote VPN access device include location circuits (e.g., a global position satellite (GPS) location circuit) as are known in the art. In such embodiments, both devices establish their own location using the location circuit, and each transfers its location to the other. Both devices can then calculate a physical distance between the pair using the pair of locations. As another example, the existence of a short range wireless connection (e.g., a Bluetooth™ connection) may be sensed by each device. In such a condition, the expected range of the short range wireless connection may be used as the physical distance between the remote VPN access device and the endpoint device. As another example, it may be determined whether the remote VPN access device is physically connected to the endpoint device via, for example, a universal serial bus (USB) connection. Where such is the case, a physical distance between the endpoint device and the remote VPN access device may be set to zero. Based upon the disclosure provided herein, one of ordinary skill in the art will recognize a variety of approaches for determining relative physical distance between the endpoint device and the remote VPN access device that may be used in relation to different embodiments.

A proximity based VPN start control module 148 is configured to start a VPN connection between endpoint device 102 and another network device upon receiving a command initiated from remote VPN access device 106. The process of starting the VPN connection, and some of the proximity based limits on such a start are discussed below in relation to FIGS. 3-6.

Proximity based VPN terminate control module 150 is configured to terminate operation of a VPN connection between endpoint device and any other network device based at least in part on a physical distance between endpoint device 102 and remote VPN access device 106. Endpoint device 102 determines whether a VPN disconnect proximity requirement has not been met. Determining whether the VPN proximity requirement is not met is done by endpoint device 102 comparing the relative physical distance of the paired devices available from relative location determination module 146 with a proximity value. Where the VPN disconnect proximity requirement has not been met (i.e., the physical distance between endpoint device 102 and the remote VPN access device 106 is greater than the proximity value), endpoint device 102 disconnects VPN connection 112.

GUI control module 140 is configured to control a GUI of endpoint device 102 and performs a number of functions in relation to the GUI including, but not limited to, displaying a pairing code usable by remote VPN access device 106 and receiving user selections via the GUI. Based upon the disclosure provided herein, one of ordinary skill in the art will recognize a number of GUI processes that may be controlled in accordance with different embodiments. User command processing module 154 is configured to accept user commands received from, for example, the GUI of endpoint device 102. Based upon the disclosure provided herein, one of ordinary skill in the art will recognize a variety of user command processing that may be done in relation to different embodiments.

Figure 1D:
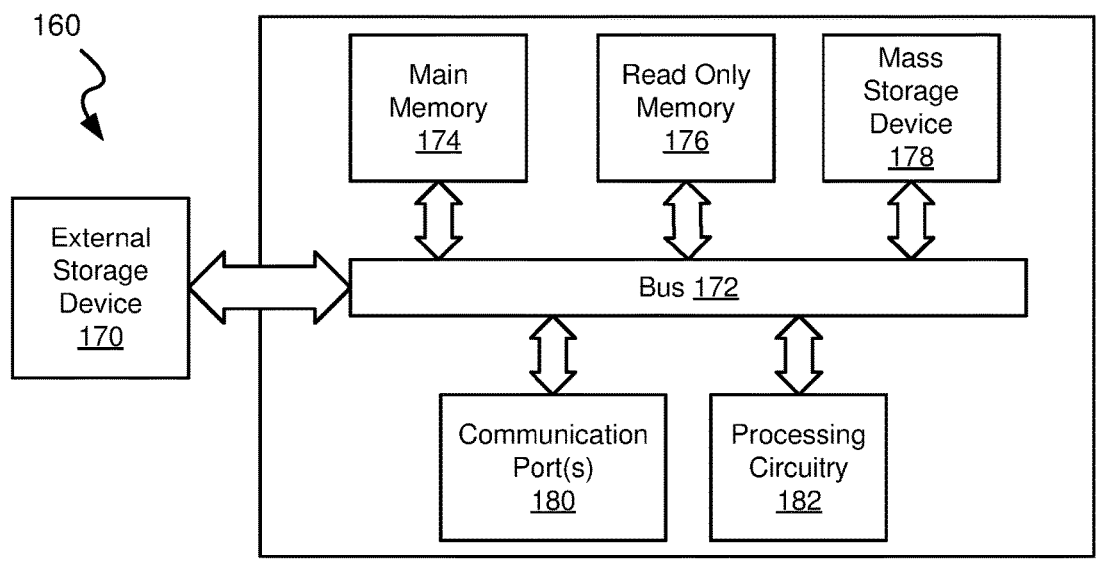

Turning to FIG. 1D, an example computer system 160 in which or with which embodiments of the present disclosure may be utilized is shown. As shown in FIG. 1C computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may be used to perform the functions discussed herein in relation to FIGS. 1A and 2-6. Those skilled in the art will appreciate that computer system 160 may include more than one processing resource and communication port 180. Non-limiting examples of processing circuitry 182 include, but are not limited to: Intel Quad-Core, Intel i3, Intel i5, Intel i7, Apple M1, AMD Ryzen, or AMD® Opteron® or Athlon MP® processor(s), Motorola® lines of processors, Forti-SOC™ system on chip processors or other future processors. Processor 1070 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K144), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

Figure 2:
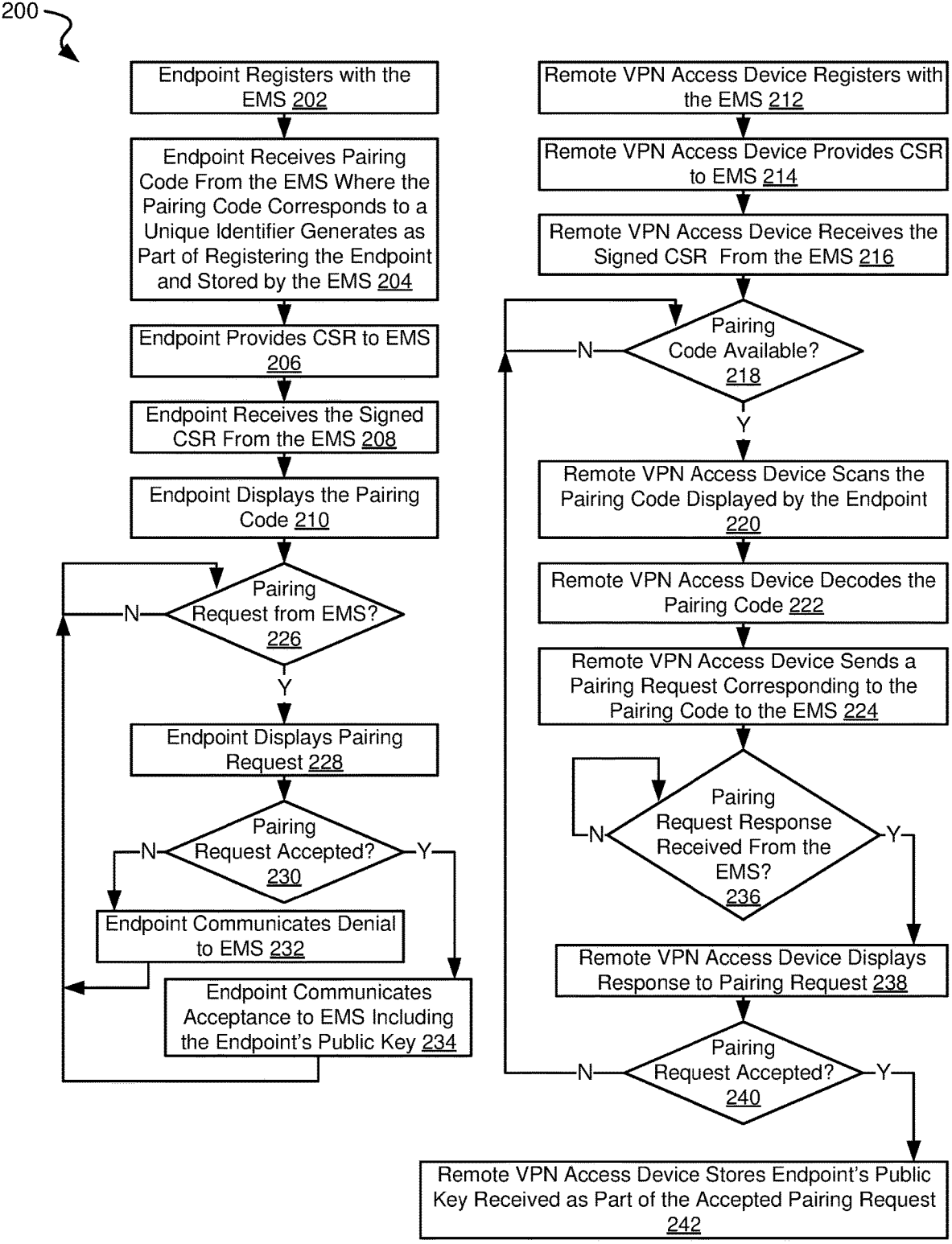
FIG. 2 is a flow diagram showing a method in accordance with some embodiments for initiating a VPN connection to/from an endpoint device under direction of a remote VPN access device.

Turning to FIG. 2, a flow diagram 200 shows a method in accordance with some embodiments for initiating VPN connection to/from an endpoint device under direction of a remote VPN access device. Following flow diagram 200, an endpoint device registers with an EMS on a network to which a VPN will later be established (block 202). This process of registering with the EMS includes standard request for registration.

As part of the registration, the EMS generates a pairing code and provides it to the endpoint device. This pairing code is a unique identifier that in some cases can be represented as a quick response (QR) code as are known in the art, and may be used by the endpoint device in relation to one or more remote VPN access devices to inform the EMS of the proposed pairings. The endpoint device receives this pairing code and stores it locally at the endpoint device (block 204).

In addition, the endpoint device provides a certificate signing request (CSR) to the EMS (block 206). The EMS performs the signing processes of the CSR and stores the relevant information, and returns the signed CSR to the endpoint device (block 208). The processes of generating, signing, and storing the CSR may be done in accordance with any process known in the art. The endpoint device 210 displays the pairing code to one or both of a user or another device (block 210). In some embodiments, the pairing code is displayed via a graphical user interface (GUI) associated with the endpoint device. Based upon the disclosure provided herein, one of ordinary skill in the art will recognize a variety of approaches that may be used in relation to different embodiments for displaying the pairing code.

Similarly, a remote VPN access device registers with the EMS (block 212). This process of registering with the EMS includes standard request for registration. The remote VPN access device provides a certificate signing request (CSR) to the EMS (block 214). The EMS performs the signing processes of the CSR and stores the relevant information, and returns the signed CSR to the remote VPN access device (block 216). The processes of generating, signing, and storing the CSR may be done in accordance with any process known in the art.

A user of the remote VPN access device determines whether a pairing code is available on the endpoint device (block 218). This may be done, for example, by the user who is co-located with the endpoint device and the remote VPN access device seeing the pairing code displayed on the GUI of the endpoint device.

Where the user indicates the availability of a pairing code (block 218), the remote VPN access device scans the pairing code displayed on the GUI of the endpoint device (block 220). This may be done, for example, by the user of the remote VPN access device pointing a camera of the remote VPN access device at the GUI of the endpoint device and capturing an image of the displayed pairing code. As mentioned above, the pairing code may be, but is not limited to, a QR code. The remote VPN access device decodes the scanned pairing code to yields the unique identifier assigned to the endpoint device by the EMS when the endpoint device registered with the EMS (block 222). The remote VPN access device sends a pairing request to the EMS (block 224). The pairing request includes the unique identifier decoded from the pairing code displayed on the GUI of the endpoint device.

In turn, the EMS forwards the pairing request to the endpoint device that is awaiting receipt of the pairing request from the EMS (block 226). Once the pairing request is received by the endpoint device from the EMS (block 226), the endpoint device displays a request to accept the pairing to the user of the endpoint device (i.e., in some cases this is the same user as the user of the remote VPN access device)(block 228). This request to accept may be displayed via the GUI of the endpoint device, and the user may respond via the same GUI.

The endpoint device determines whether the user accepted the pairing request (block 230). Where the pairing request was either rejected or no response was received within a defined, programmable time period (block 230), the endpoint device communicates a denial of the pairing to the EMS (block 232). Otherwise, where the pairing request is accepted (block 230), the endpoint device communicates acceptance of the pairing to the EMS (block 234). The message to the EMS indicating the accepted pairing includes the public key of the endpoint device.

In turn, the EMS forwards the response to the pairing request to the remote VPN access device that is awaiting a response to the previously sent pairing request (block 236). It is determined whether the message received from the EMS indicates that the pairing request was accepted (block 240). Where the pairing request indicates that the pairing was accepted (block 240), the remote VPN access device stores the public key of the endpoint device that was received as part of the pairing request (block 242). At this juncture, any communications directly between the endpoint device and the remote VPN access device can be encrypted using the public key. In addition, the EMS has knowledge of the pairing between the remote VPN access device and the endpoint device. The EMS can unilaterally revoke the pairing at any time by revoking the certificate issued to either the remote VPN access device and/or the endpoint device. In such a situation, one or both devices would need to re-register with the EMS either with or without a pairing.

Figure 3:
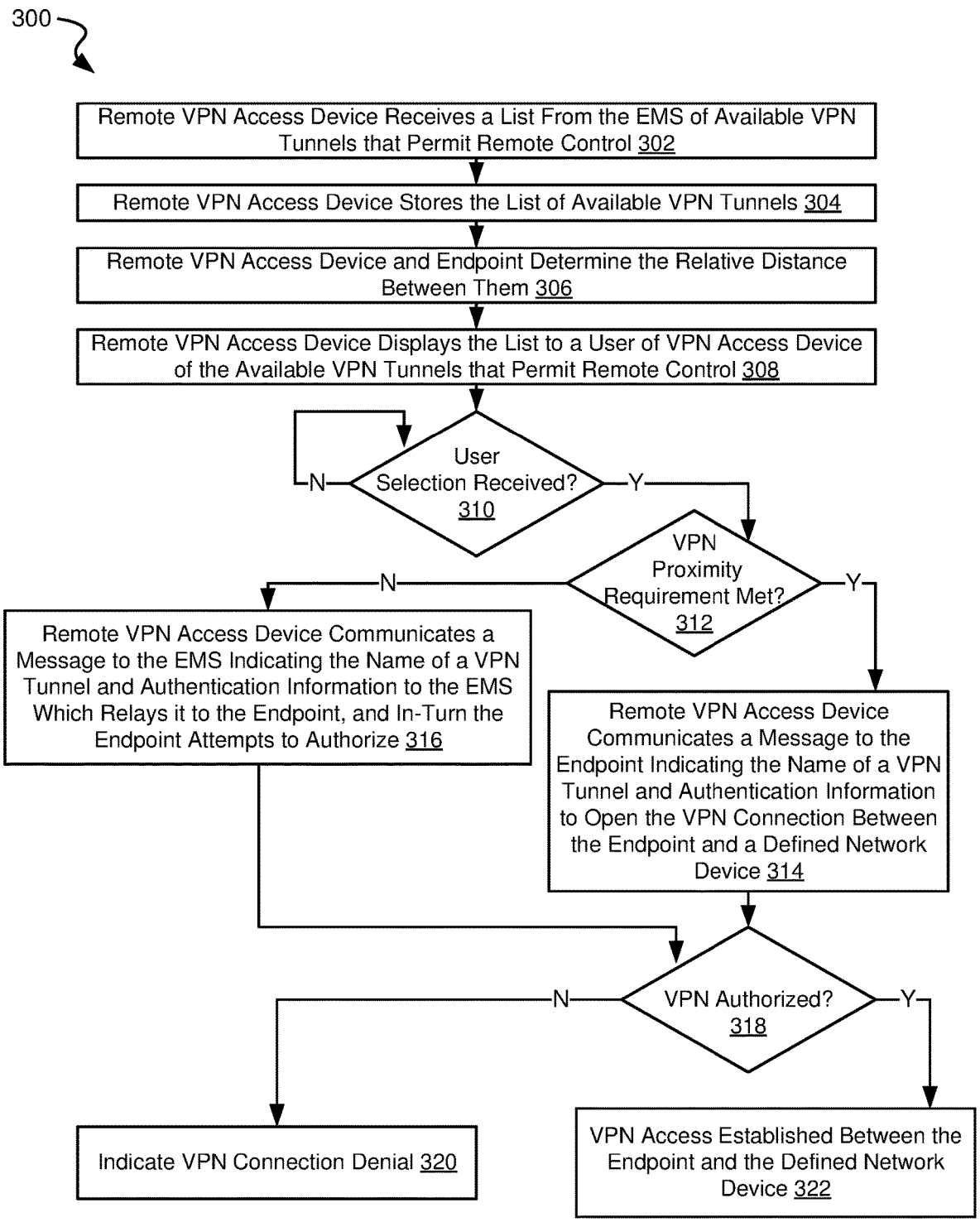
FIG. 3 is a flow diagram showing a method in accordance with one or more embodiments for establishing a VPN connection between the endpoint device and another network device.

Turning to FIG. 3, a flow diagram 300 shows a method in accordance with one or more embodiments for establishing a VPN connection between the endpoint device and another network device. As an example, the method may be used for establishing VPN connection 112 of FIG. 1A. Following flow diagram 300, the remote VPN access device that was previously paired with the endpoint device as discussed above in relation to FIG. 2 receives a list of available VPN tunnels that permit remote control (block 302). Such VPN tunnels are between the endpoint device and another network device indicated by the remote VPN access device. The remote VPN access device stored the list of available VPN tunnels (block 304).

The paired endpoint device and remote VPN access device periodically (e.g., based upon a periodic timer with a user programmable period) or continuously update the relative physical distance between them (block 306). This process of updating the relative physical distance may be done using any process known in the art for determining distance. For example, in some embodiments, both the endpoint device and the remote VPN access device include location circuits (e.g., a global position satellite (GPS) location circuit) as are known in the art. In such embodiments, both devices establish their own location using the location circuit, and each transfers its location to the other. Both devices can then calculate a physical distance between the pair using the pair of locations. As another example, the existence of a short range wireless connection (e.g., a Bluetooth™ connection) may be sensed by each device. In such a condition, the expected range of the short range wireless connection may be used as the physical distance between the remote VPN access device and the endpoint device. As another example, it may be determined whether the remote VPN access device is physically connected to the endpoint device via, for example, a universal serial bus (USB) connection. Where such is the case, a physical distance between the endpoint device and the remote VPN access device may be set to zero. Based upon the disclosure provided herein, one of ordinary skill in the art will recognize a variety of approaches for determining relative physical distance between the endpoint device and the remote VPN access device that may be used in relation to different embodiments.

The remote VPN access device displays the list of available VPN tunnels that permit remote control (block 308). This may be displayed via a GUI of the remote VPN access device. The remote VPN access device then awaits selection of one of the available VPN tunnels from, for example, a user of the remote VPN access device (block 310). Once the user of the remote VPN access device selects one of the available VPN tunnels (block 310), it is determined whether a VPN proximity requirement is met (block 312). Determining whether the VPN proximity requirement is met is done by comparing the relative physical distance of the paired devices with a proximity value. In some embodiments, the proximity value is a user programmable maximum relative physical distance between the paired remote VPN access device and the endpoint device. In some embodiments, this proximity value is received from a user of the endpoint device upon setup of one or both of the remote VPN access device and/or the endpoint device. This proximity value may be stored local to both the endpoint device and the remote VPN access device. In other embodiments, a proximity value is received from a network administrator at the EMS, and when the pairing between the endpoint device and the remote VPN access device is completed as discussed above in relation to FIG. 2, the proximity value is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN proximity requirement is met (i.e., the physical distance between the endpoint device and the remote VPN access device is below a threshold)(block 312), the remote VPN access device communicates a message directly to the endpoint device indicating the name of a VPN tunnel and corresponding authentication information that can be used to open the VPN connection between the endpoint device and a defined network device (block 314). Alternatively, where the VPN proximity requirement is not met (i.e., the physical distance between the endpoint device and the remote VPN access device is more than a threshold) (block 312), the remote VPN access device communicates a message to the EMS indicating the name of a VPN tunnel and corresponding authentication information needed to establish the VPN connection between the endpoint device and the defined network device (block 316).

The authorization information (either forwarded from the remote VPN access device directly or indirectly from the EMS) is used to authorize establishment of the VPN connection indicated in the message by the endpoint device, and the endpoint device determines whether the VPN connection was properly authorized (block 318). Where the VPN connection was not properly authorized (block 318), a VPN connection denial message is indicated (block 320). Otherwise, where the VPN connection was properly authorized (block 318), VPN access is established between the endpoint device and the defined network device (block 322).

Figure 4:
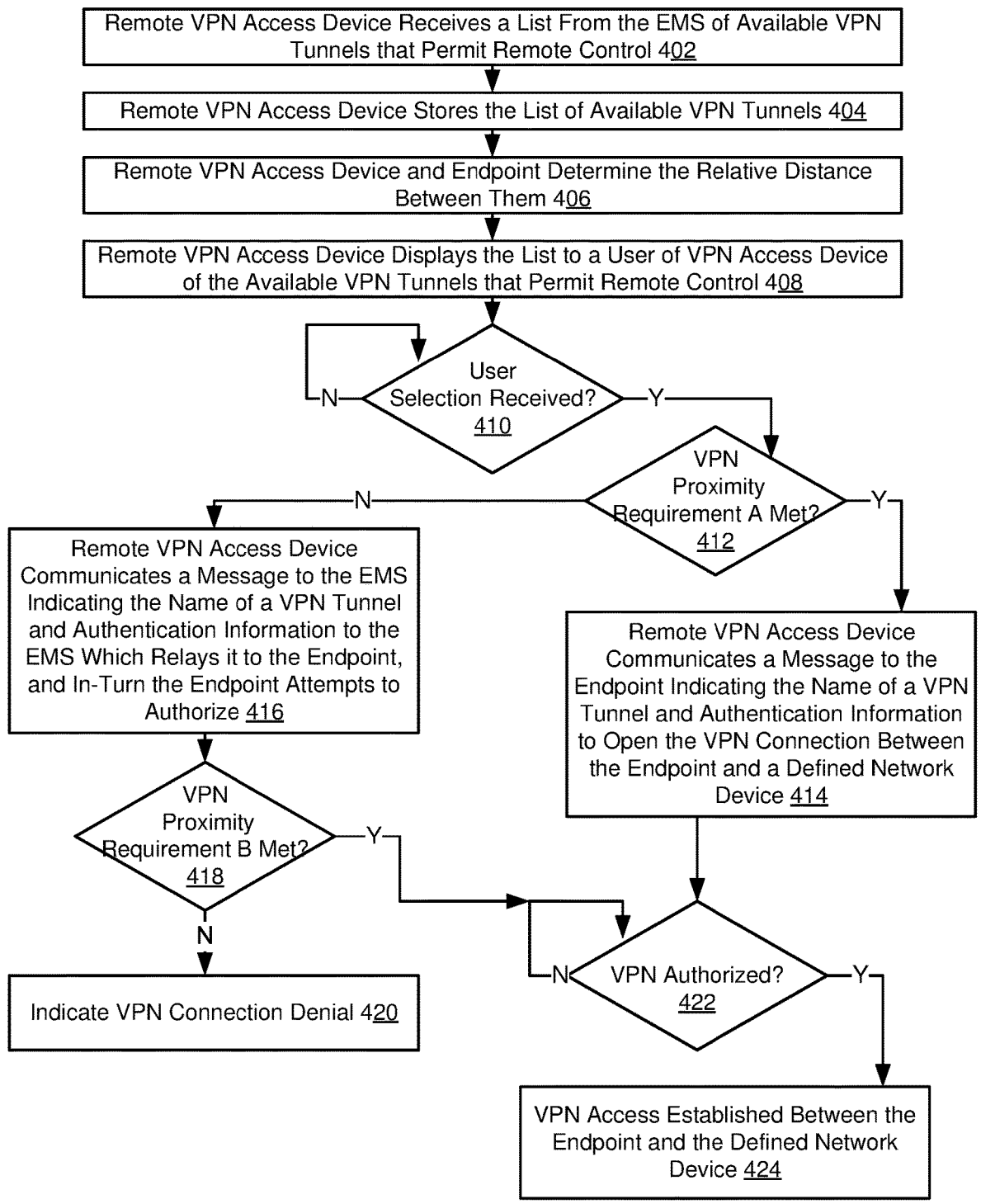
FIG. 4 is a flow diagram showing a method in accordance with other embodiments for establishing a VPN connection between the endpoint device and another network device.

Turning to FIG. 4, a flow diagram 400 shows a method in accordance with other embodiments for establishing a VPN connection between the endpoint device and another network device using different proximity values for establishing a VPN via the EMS than for establishing a VPN via the endpoint device. Following flow diagram 400, the remote VPN access device that was previously paired with the endpoint device as discussed above in relation to FIG. 2 receives a list of available VPN tunnels that permit remote control (block 402). Such VPN tunnels are between the endpoint device and another network device indicated by the remote VPN access device. The remote VPN access device stored the list of available VPN tunnels (block 404).

The paired endpoint device and remote VPN access device periodically or continuously update the relative physical distance between them (block 406). This process of updating the relative physical distance may be done using any process known in the art for determining distance. Based upon the disclosure provided herein, one of ordinary skill in the art will recognize a variety of approaches for determining relative physical distance between the endpoint device and the remote VPN access device that may be used in relation to different embodiments.

The remote VPN access device displays the list of available VPN tunnels that permit remote control (block 408). This may be displayed via a GUI of the remote VPN access device. The remote VPN access device then awaits selection of one of the available VPN tunnels (block 410). Once the user of remote VPN access device selects one of the available VPN tunnels (block 410), it is determined whether a VPN A proximity requirement is met for direct communication between the remote VPN access device and the endpoint device (i.e., a VPN A proximity requirement) (block 412). Determining whether the VPN proximity requirement A is met is done by comparing the relative physical distance of the paired devices with a proximity value A. In some embodiments, the proximity value A is a user programmable maximum relative physical distance between the paired remote VPN access device and the endpoint device. In some embodiments, this proximity value A is received from a user of the endpoint device upon setup of one or both of the remote VPN access device and/or the endpoint device. This proximity value A may be stored local to both the endpoint device and the remote VPN access device. In other embodiments, a proximity value A is received from a network administrator at the EMS, and when the pairing between the endpoint device and the remote VPN access device is completed as discussed above in relation to FIG. 2, the proximity value A is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN proximity requirement A is met (i.e., the physical distance between the endpoint device and the remote VPN access device is below the proximity value A)(block 412), the remote VPN access device communicates a message directly to the endpoint device indicating the name of a VPN tunnel and corresponding authentication information that can be used to open the VPN connection between the endpoint device and a defined network device (block 414). Alternatively, where the VPN proximity requirement A is not met (i.e., the physical distance between the endpoint device and the remote VPN access device is more than the proximity requirement A)(block 412), the remote VPN access device communicates a message to the EMS indicating the name of a VPN tunnel and corresponding authentication information needed to establish the VPN connection between the endpoint device and the defined network device (block 416). The message includes the physical distance between the endpoint device and the remote VPN access device.

The EMS compares the physical distance between the endpoint device and the remote VPN access device with a proximity value B (i.e., a VPN proximity requirement B) (block 418). Where the VPN proximity requirement B is not met (i.e., the physical distance between the endpoint device and the remote VPN access device is more than the proximity value B (block 418), the EMS sends a message to the remote VPN access device indicating a denial of a remotely initiated VPN connection for the endpoint device (block 420).

Alternatively, where the VPN proximity requirement B is met (i.e., the physical distance between the endpoint device and the remote VPN access device is less than the proximity value B)(block 418), the EMS forwards the authorization information and VPN connection request to the endpoint device. The authorization information (either forwarded from the remote VPN access device directly or indirectly from the EMS) is used to authorize establishment of the VPN connection indicated in the message by the endpoint device, and the endpoint device determines whether the VPN connection was properly authorized (block 422). Where the VPN connection is properly authorized (block 422), VPN access is established between the endpoint device and the defined network device (block 424). The proximity value B is greater than the proximity value A. In the method, where the paired devices are reasonably close, direct communication between the remote VPN access device and the endpoint device is used to set up the VPN connection. Alternatively, where the distance is larger, indirect communication via the EMS is used to set up the VPN connection. Where the distance is greater than proximity value B, the VPN connection is not established.

Figure 5:
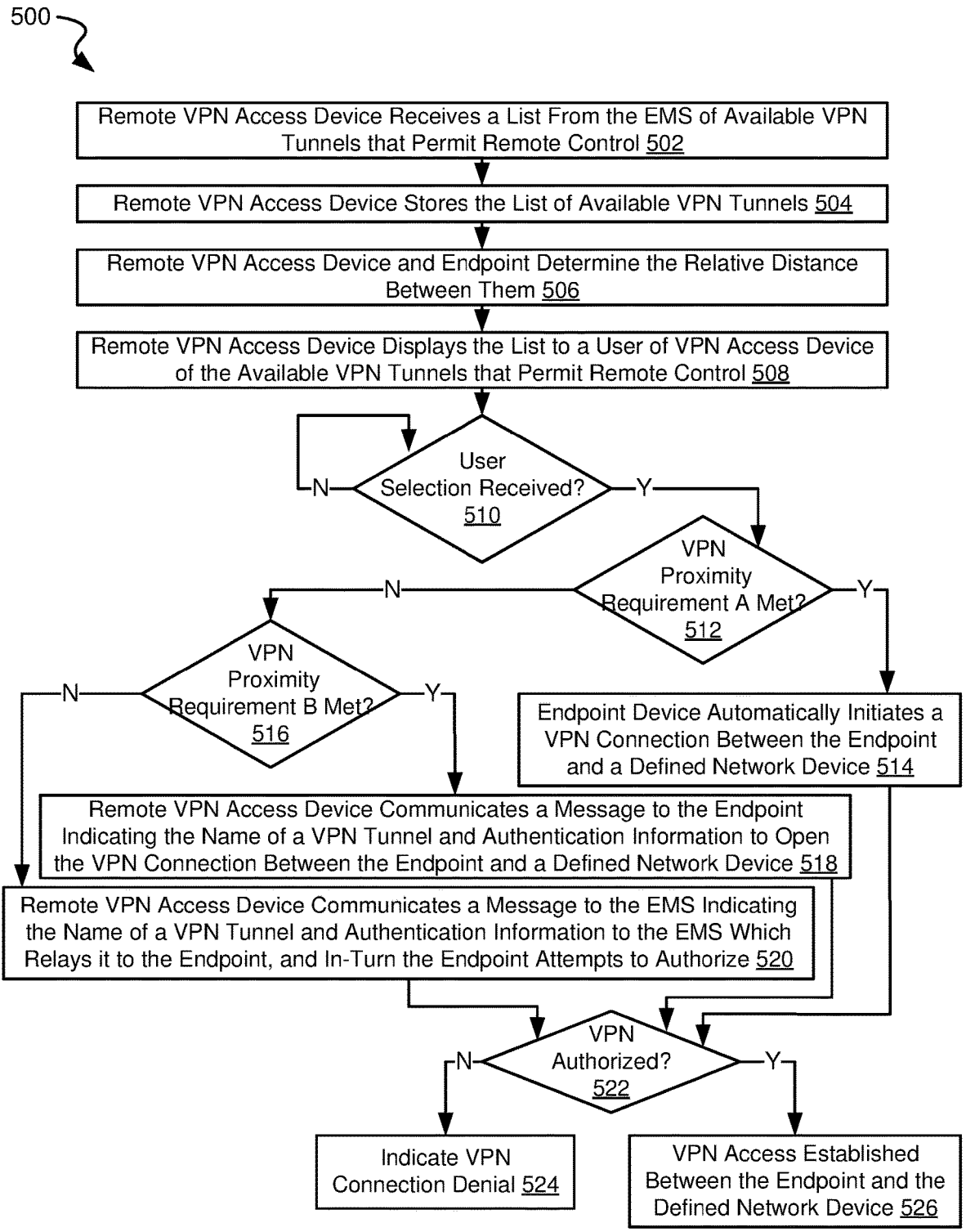
FIG. 5 is a flow diagram showing a method in accordance with yet other embodiments for establishing a VPN connection between the endpoint device and another network device.

Turning to FIG. 5, a flow diagram 500 shows a method in accordance with other embodiments for establishing a VPN connection between the endpoint device either manually by messaging from the remote VPN access device to the endpoint device based upon a distance between the remote VPN access device to the endpoint device, or automatically based upon another distance between the remote VPN access device to the endpoint device. Following flow diagram 500, the remote VPN access device that was previously paired with the endpoint device as discussed above in relation to FIG. 2 receives a list of available VPN tunnels that permit remote control (block 502). Such VPN tunnels are between the endpoint device and another network device indicated by the remote VPN access device. The remote VPN access device stored the list of available VPN tunnels (block 504).

The paired endpoint device and remote VPN access device periodically or continuously update the relative physical distance between them (block 506). This process of updating the relative physical distance may be done using any process known in the art for determining distance. Based upon the disclosure provided herein, one of ordinary skill in the art will recognize a variety of approaches for determining relative physical distance between the endpoint device and the remote VPN access device that may be used in relation to different embodiments.

The remote VPN access device displays the list of available VPN tunnels that permit remote control (block 508). This may be displayed via a GUI of the remote VPN access device. The remote VPN access device then awaits selection of one of the available VPN tunnels (block 510). Once the user of remote VPN access device selects one of the available VPN tunnels (block 510), it is determined whether a VPN A proximity requirement (a first defined distance between the endpoint device and the remote VPN access device) is met (block 512). Determining whether the VPN proximity requirement A is met is done by comparing the relative physical distance of the paired devices with a proximity value A. In some embodiments, the proximity value A is a user programmable maximum relative physical distance between the paired remote VPN access device and the endpoint device. In some embodiments, this proximity value A is received from a user of the endpoint device upon setup of one or both of the remote VPN access device and/or the endpoint device. This proximity value A may be stored local to both the endpoint device and the remote VPN access device. In other embodiments, a proximity value A is received from a network administrator at the EMS, and when the pairing between the endpoint device and the remote VPN access device is completed as discussed above in relation to FIG. 2, the proximity value A is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN A proximity requirement is met (i.e., the physical distance between the endpoint device and the remote VPN access device is below the proximity value A)(block 512), the endpoint device automatically initiates a VPN connection between the endpoint device and a defined network device (block 514).

Alternatively, where the VPN A proximity requirement is not met (i.e., the physical distance between the endpoint device and the remote VPN access device is greater than the proximity value A) (block 512), it is determined whether a VPN proximity requirement B (a second defined proximity value, proximity value B, between the endpoint device and the remote VPN access device) is met (block 516). Determining whether the VPN proximity requirement B is met is done by comparing the relative physical distance of the paired devices with a proximity value B. In some embodiments, the proximity value B is a user programmable maximum relative physical distance between the paired remote VPN access device and the endpoint device. In some embodiments, this proximity value B is received from a user of the endpoint device upon setup of one or both of the remote VPN access device and/or the endpoint device. This proximity value B may be stored local to both the endpoint device and the remote VPN access device. In other embodiments, a proximity value A is received from a network administrator at the EMS, and when the pairing between the endpoint device and the remote VPN access device is completed as discussed above in relation to FIG. 2, the proximity value A is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN B proximity requirement is met (i.e., the physical distance between the endpoint device and the remote VPN access device is below the proximity value B) (block 516), the remote VPN access device communicates a message directly to the endpoint device indicating the name of a VPN tunnel and corresponding authentication information that can be used to open the VPN connection between the endpoint device and a defined network device (block 518). Alternatively, where the VPN proximity requirement is not met (i.e., the physical distance between the endpoint device and the remote VPN access device is more than the proximity value B)(block 516), the remote VPN access device communicates a message to the EMS indicating the name of a VPN tunnel and corresponding authentication information needed to establish the VPN connection between the endpoint device and the defined network device (block 520).

The authentication information (either forwarded from the remote VPN access device directly or indirectly from the EMS) is used to authorize establishment of the VPN connection indicated in the message by the endpoint device, and the endpoint device determines whether the VPN connection was properly authorized (block 522). Where the VPN connection was not properly authorized (block 522), a VPN connection denial message is indicated (block 524). Otherwise, where the VPN connection was properly authorized (block 522), VPN access is established between the endpoint device and the defined network device (block 526).

Figure 6:
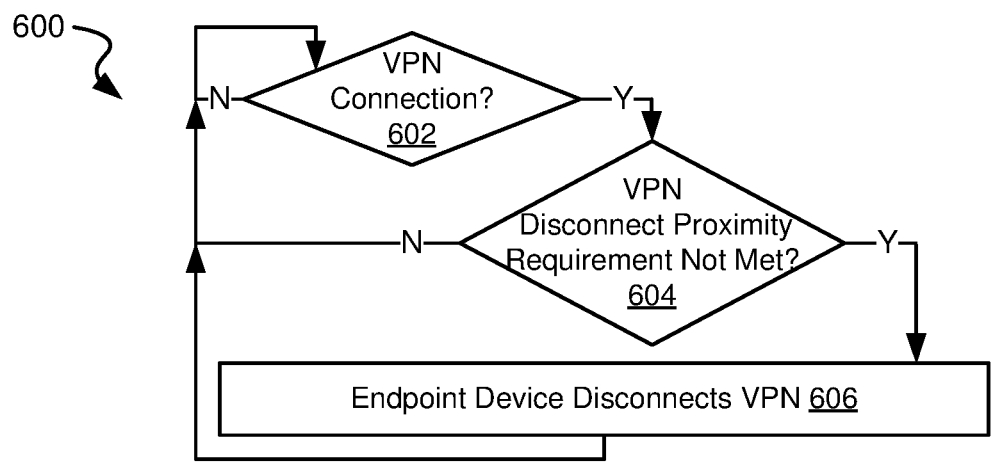
FIG. 6 is a flow diagram showing a method in accordance with some embodiments for proximity based automatic VPN connection disconnect.

Turning to FIG. 6, a flow diagram 600 shows a method in accordance with some embodiments for automatically disconnecting a VPN connection based upon a proximity between a paired remote VPN access device and endpoint device. Following flow diagram 600, it is determined if the endpoint device is currently using a VPN connection (block 602). Where a VPN connection is being used (block 602), it is determined by the endpoint device whether a VPN disconnect proximity requirement has not been met (block 604). Determining whether the VPN proximity requirement is not met is done by the endpoint device comparing the relative physical distance of the paired devices with a proximity value. This proximity value may be the same as that which was used to establish the VPN connections (see FIGS. 3-5), or may be different. In some embodiments, the proximity value is a user programmable maximum relative physical distance between the paired remote VPN access device and the endpoint device. In some embodiments, this proximity value is received from a user of the endpoint device upon setup of one or both of the remote VPN access device and/or the endpoint device. This proximity value may be stored local to both the endpoint device and the remote VPN access device. In other embodiments, a proximity value is received from a network administrator at the EMS, and when the pairing between the endpoint device and the remote VPN access device is completed as discussed above in relation to FIG. 2, the proximity value is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN disconnect proximity requirement has not been met (i.e., the physical distance between the endpoint device and the remote VPN access device is greater than the proximity value)(block 604), the endpoint device disconnects the VPN connection (block 606). Disconnecting the VPN connection may be done using any process known in the art.

Figure 7:
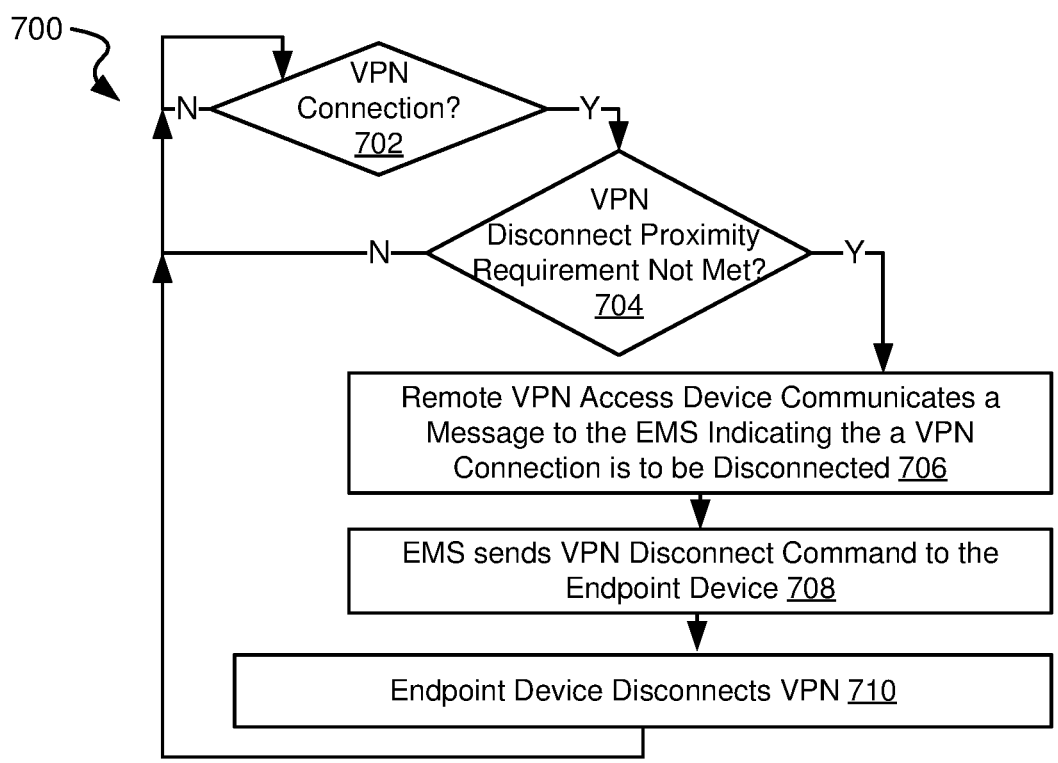
FIG. 7 is a flow diagram showing a method in accordance with other embodiments for proximity based automatic VPN connection disconnect.

Turning to FIG. 7, a flow diagram 700 shows another method in accordance with other embodiments for automatically disconnecting a VPN connection based upon a proximity between a paired remote VPN access device and endpoint device. Following flow diagram 700, it is determined if the endpoint device is currently using a VPN connection (block 702). Where a VPN connection is being used (block 702), it is determined by the remote VPN access device whether a VPN disconnect proximity requirement has not been met (block 704). Determining whether the VPN proximity requirement is not met is done by the remote VPN access device comparing the relative physical distance of the paired devices with a proximity value. This proximity value may be the same as that which was used to establish the VPN connections (see FIGS. 3-5), or may be different. In some embodiments, the proximity value is a user programmable maximum relative physical distance between the paired remote VPN access device and the endpoint device. In some embodiments, this proximity value is received from a user of the endpoint device upon setup of one or both of the remote VPN access device and/or the endpoint device. This proximity value may be stored local to both the endpoint device and the remote VPN access device. In other embodiments, a proximity value is received from a network administrator at the EMS, and when the pairing between the endpoint device and the remote VPN access device is completed as discussed above in relation to FIG. 2, the proximity value is provided to one or both of the remote VPN access device and/or the endpoint device. Based upon the disclosure provided herein, one of ordinary skill in the art will recognize a variety of ways for creating a proximity value that is used to determine whether a VPN proximity requirement is met in accordance with different embodiments.

Where the VPN disconnect proximity requirement has not been met (i.e., the physical distance between the endpoint device and the remote VPN access device is greater than the proximity value)(block 704), the remote VPN access device communicates a message to the EMS indicating that a VPN connection is to be disconnected (block 706). In turn, the EMS sends a message to the endpoint device commanding a disconnect of the VPN connection (block 708). In response, the endpoint device disconnects the VPN connection (block 710). Disconnecting the VPN connection may be done using any process known in the art.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the example hardware, software, processes, methods, and/or operating systems described herein are for illustrative purposes and, thus, are not intended to be limited to any particular name. While the foregoing describes various embodiments of the disclosure, other and further embodiments may be devised without departing from the basic scope thereof.

What is claimed is:

1. A method for remote governance of a virtual private network (VPN) connection, the method comprising:
receiving, from a processing resource, a distance between a remote VPN access device and an endpoint device; and
modifying, by the processing resource, a VPN connection of the endpoint device based at least in part upon the distance between the remote VPN access device and the endpoint device, wherein the modifying is done according to a first modification process when the distance between the remote VPN access device and the endpoint device is less than a first threshold, and wherein the modifying is done according to a second modification process when the distance between the remote VPN access device and the endpoint device is greater than the first threshold and less than a second threshold; and
wherein the second modification process includes:
receiving, by the processing resource, a message from an endpoint management system physically separate from the endpoint device, wherein the message indicates a name of a VPN tunnel and authentication information; and
initiating, by the processing resource, a VPN connection between the VPN access device and the endpoint device using the name of the VPN tunnel and the authentication information.

2. The method of claim 1, wherein the modifying further includes automatically terminating the VPN connection where the distance between the remote VPN access device and the endpoint device is greater than a third threshold.

3. The method of claim 2, wherein receiving the distance between the remote VPN access device and the endpoint device comprises:

determining, by the processing resource, the distance between the remote VPN access device and the endpoint device.

4. The method of claim 1, the method further comprising:
receiving, by the processing resource, a message initiated by the remote VPN access device requesting termination of the VPN connection, wherein the message initiated by the remote VPN access device is based at least in part on the distance between the remote VPN access device and an endpoint device; and
wherein the second modification process is done based at least in part on the message and includes terminating the VPN connection.

5. The method of claim 4, wherein the message initiated by the remote VPN access device is received by the processing resource via an endpoint management system with which both the remote VPN access device and the endpoint device are registered.

6. The method of claim 1, the method further comprising:
receiving, by the processing resource, a message initiated by the remote VPN access device requesting initiation of the VPN connection, wherein the message initiated by the remote VPN access device is based at least in part on the distance between the remote VPN access device and an endpoint device; and
wherein the second modification process is done based at least in part on the message and includes initiating the VPN connection.

7. The method of claim 6, wherein the message initiated by the remote VPN access device is received by the processing resource via an endpoint management system with which both the remote VPN access device and the endpoint device are registered.

8. The method of claim 6, wherein the message initiated by the remote VPN access device is received by the processing resource directly from the remote VPN access device.

9. The method of claim 1, wherein the distance between the remote VPN access device and the endpoint device is determined by determining, by the processing device, that the remote VPN access device is communicably coupled to the endpoint device via a type of network, and wherein the distance is selected based upon the type of network.

10. The method of claim 1, the method further comprising:
registering, by the processing resource, the endpoint device with the same endpoint management system with which the remote VPN access device is registered; and
pairing, by the processing resource, the endpoint device with the remote VPN access device.

11. The method of claim 1, wherein the first modification process includes:
initiating, by the processing resource, a VPN connection between the VPN access device and the endpoint device.

12. The method of claim 1, wherein the message is sent by the VPN access device to the endpoint management system, and forwarded by the endpoint management system to the endpoint device.

13. A method for remote governance of a virtual private network (VPN) connection, the method comprising:
determining, by a processing resource, a distance between a remote VPN access device and an endpoint device;
comparing, by the processing resource, the distance between the remote VPN access device and the endpoint device with a first threshold;
comparing, by the processing resource, the distance between the remote VPN access device and the endpoint device with a second threshold;
sending, by the processing resource, a message requesting modification of a VPN connection of the endpoint device, wherein sending the message is based at least in part upon comparing the distance between the remote VPN access device and the endpoint device includes:
sending the message directly to the endpoint device when the distance is greater than the first threshold and less than the second threshold; or
sending the message indirectly to the endpoint device via an endpoint management system when the distance is greater than the second threshold.

14. The method of claim 13, the method further comprising:
registering, by the processing resource, the remote VPN access device with the same endpoint management system with which the endpoint device is registered; and
pairing, by the processing resource, the endpoint device with the remote VPN access device.

15. A system for remote governance of a virtual private network (VPN) connection, the system comprising:
a remote VPN access device, the remote VPN access device including a first processing resource and a first non-transient computer readable medium, wherein the first non-transient computer readable medium includes instructions that when executed by the first processing resource causes the remote VPN access device to:
determine a distance between the remote VPN access device and an endpoint device;
compare the distance between the remote VPN access device and the endpoint device with a first threshold;
compare the distance between the remote VPN access device and the endpoint device with a second threshold;
send a message requesting modification of a VPN connection of the endpoint device, wherein sending the message includes:
sending the message directly to the endpoint device when the distance is greater than the first threshold and less than the second threshold; or
sending the message indirectly to the endpoint device via an endpoint management system when the distance is greater than the second threshold; and
the endpoint device including a second processing resource and a second non-transient computer readable medium, wherein the second non-transient computer readable medium includes instructions that when executed by the second processing resource causes the endpoint device to:
receive the message requesting modification of the VPN connection of the endpoint device; and
modify the VPN connection of the endpoint device based at least in part upon the message requesting modification of the VPN connection of the endpoint device.

16. The system of claim 15, wherein the first non-transient computer readable medium further includes instructions that when executed by the first processing resource causes the remote VPN access device to:
register the remote VPN access device with the same endpoint management system with which the endpoint device is registered; and pair the endpoint device with the remote VPN access device.

17. The system of claim 15, wherein the second non-transient computer readable medium further includes instructions that when executed by the second processing resource causes the endpoint device to:
  register the endpoint device with the same endpoint management system with which the remote VPN access device is registered; and
  pair the endpoint device with the remote VPN access device.

18. A non-transient computer readable medium, the non-transient computer readable medium including instructions that when executed by a processing resource cause the processing resource to perform the method of:
  determining a distance between a remote virtual private network (VPN) access device and an endpoint device;
  comparing the distance between the remote VPN access device and the endpoint device with a first threshold;
  comparing the distance between the remote VPN access device and the endpoint device with a second threshold; and
  sending a message requesting modification of a VPN connection of the endpoint device, wherein sending the message includes:
    sending the message directly to the endpoint device when the distance is greater than the first threshold and less than the second threshold; or
    sending the message indirectly to the endpoint device via an endpoint management system when the distance is greater than the second threshold.

19. A method for remote governance of a virtual private network (VPN) connection, the method comprising:
  receiving, from a processing resource, a distance between a remote VPN access device and an endpoint device; and
  modifying, by the processing resource, a VPN connection of the endpoint device based at least in part upon the distance between the remote VPN access device and the endpoint device, wherein the modifying is done according to a first modification process when the distance between the remote VPN access device and the endpoint device is less than a first threshold, and wherein the modifying is done according to a second modification process when the distance between the remote VPN access device and the endpoint device is greater than the first threshold and less than a second threshold;
  wherein the second modification process includes:
    receiving, by the processing resource, a message from the VPN access device, wherein the message indicates a name of a VPN tunnel and authentication information; and
    initiating, by the processing resource, a VPN connection between the VPN access device and the endpoint device using the name of the VPN tunnel and the authentication information; and
  wherein the modifying is further done in accordance with a third modification process when the distance between the remote VPN access device and the endpoint device is greater than the second threshold, and wherein the third modification process includes:
    receiving, by the processing resource, a message from an endpoint management system physically separate from the endpoint device, wherein the message indicates a name of a VPN tunnel and authentication information; and
    initiating, by the processing resource, a VPN connection between the VPN access device and the endpoint device using the name of the VPN tunnel and the authentication information.

20. The method of claim 19, wherein the message is sent by the VPN access device to the endpoint management system, and forwarded by the endpoint management system to the endpoint device.

* * * * *